United States Patent [19]

Di Pietro et al.

[11] Patent Number: 5,199,569
[45] Date of Patent: Apr. 6, 1993

[54] PACKAGE FOR SHEETS OF X-RAY FILM

[75] Inventors: Matthew Di Pietro, Webster; Thomas J. Kausch; Vincent B. Dethier, both of Rochester, all of N.Y.

[73] Assignee: Eastman Kodak Company, Rochester, N.Y.

[21] Appl. No.: 802,967

[22] Filed: Dec. 6, 1991

[51] Int. Cl.⁵ .............................................. B65D 85/00
[52] U.S. Cl. .................................... 206/455; 229/316; 354/276; 378/184
[58] Field of Search ....................... 206/449, 454, 455; 378/186, 184, 187, 185, 173, 174; 354/276; 279/313, 316; 383/207, 209

[56] References Cited

U.S. PATENT DOCUMENTS

| | | | |
|---|---|---|---|
| 2,071,110 | 2/1937 | Burke | 206/455 X |
| 2,112,816 | 3/1938 | Rulon | 206/455 X |
| 2,675,957 | 4/1954 | Zimmerman | 383/207 X |
| 2,976,989 | 3/1961 | Wiesmer | 206/455 |
| 3,625,351 | 12/1971 | Eisenberg | 383/207 X |
| 3,934,735 | 1/1976 | Schmidt | |
| 4,135,800 | 1/1979 | Weidanz et al. | |
| 4,192,420 | 3/1980 | Worrell, Sr. et al. | 383/207 X |
| 4,531,878 | 7/1985 | Tamura | |
| 4,537,307 | 8/1985 | Tamura | |
| 4,555,213 | 11/1985 | Tamura et al. | |
| 4,571,140 | 2/1986 | Yamada et al. | |
| 4,721,209 | 1/1988 | Guazzotti | 206/455 |
| 4,725,011 | 2/1988 | Zanner et al. | |
| 4,738,366 | 4/1988 | Schmidt et al. | |
| 4,783,019 | 11/1988 | Schmidt et al. | |
| 4,809,313 | 2/1989 | Gandolfo | |
| 4,909,389 | 3/1990 | Plessers et al. | |
| 5,048,685 | 9/1991 | Kausch et al. | 206/455 |
| 5,048,686 | 9/1991 | Kausch et al. | 206/455 |

Primary Examiner—Bryon P. Gehman
Attorney, Agent, or Firm—Frank Pincelli

[57] ABSTRACT

A package for a stack of X-ray film sheets has a pouch and a leader secured to the pouch. Heat seals secure side edge portions of the leader to edges of outer faces of sheets forming the pouch. Rows of perforations and slits in the leader adjacent the heat seals enables tearing of the leader from the pouch edges.

6 Claims, 4 Drawing Sheets

PACKAGE FOR SHEETS OF X-RAY FILM

BACKGROUND OF THE INVENTION

The present invention relates to a package for enclosing a plurality of sheets of material, such as a stack of x-ray film.

It is known to provide light tight packages for holding stacks of sheets of x-ray film or the like. Such film packages can be placed in magazines or cassettes having a spindle, and a leader on the package is attached to the spindle. Then the magazine or cassette is closed and the spindle rotated to strip the packaging material from the stack of sheets. Thereafter, the magazine is provided to an autoloader or other apparatus having a light tight compartment wherein the sheets can be removed seriatim for use. Alternatively, the package can be manually opened in a light tight environment and sheets removed and loaded into light tight cassettes of the kind used for making x-rays of patients. Packages and magazines of the kind described above are disclosed, for example, in U.S. Pat. No. 5,019,849, issued May 28, 1991; in U.S. Pat. No. 5,048,686, issued Sep. 17, 1991; and in Italian Patent No. 1,062,043.

Leaders on packages of the kind mentioned above sometimes need to be relatively large in order to extend from the pouch portion of the magazine which holds the film sheets to the spindle of the magazine. Generally, the leaders are folded onto only one side of the package and may be secured to that side only by pressure sensitive tape, for example, as disclosed in the before-mentioned U.S. Pat. No. 5,048,686. While this arrangement works satisfactorily, it does leave a major portion of the leader unrestrained, especially along the side edges of the leader. As a result, the flap can be accidentally separated from the outer face of the package. Also, when the leaders are relatively long, it would be desirable to position portions of the leader on both the top face and bottom face of the package without unnecessarily complicating attachment of the leader to the faces of the package. Equipment used for loading stacks of film into a package may have a hopper got holding a stack of empty packages. With such equipment, it is desirable to have the leader securely attached to the pouch portion of the package.

SUMMARY OF THE INVENTION

An object of the invention is to provide a package for sheets of x-ray film or the like wherein the leader is attached to the package so that it is unlikely to be accidentally separated from the upper or lower faces of the package, but wherein the leader can be easily extended to full length for attachment to a spindle or the like.

In accordance with the present invention, a package of the kind discussed above is provided having a pouch for enclosing the sheets of film or other material. The pouch has a first face and a second face located in generally parallel planes with the sheets being positioned between the faces. Portions of the pouch are secured together around the sheets to form a light tight enclosure for the film. A leader is secured to a leading edge of the pouch, and the leader is engageable by a spindle or the like for removing the pouch from the sheets of film. The leader is folded over the first and second faces of the pouch and has side edge portions that are secured to the side edges of the pouch. Preferably, the leader has lines of perforations and slits that enable an operator to separate the leader from the side edges of the pouch by simply pulling the leader away from the pouch.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
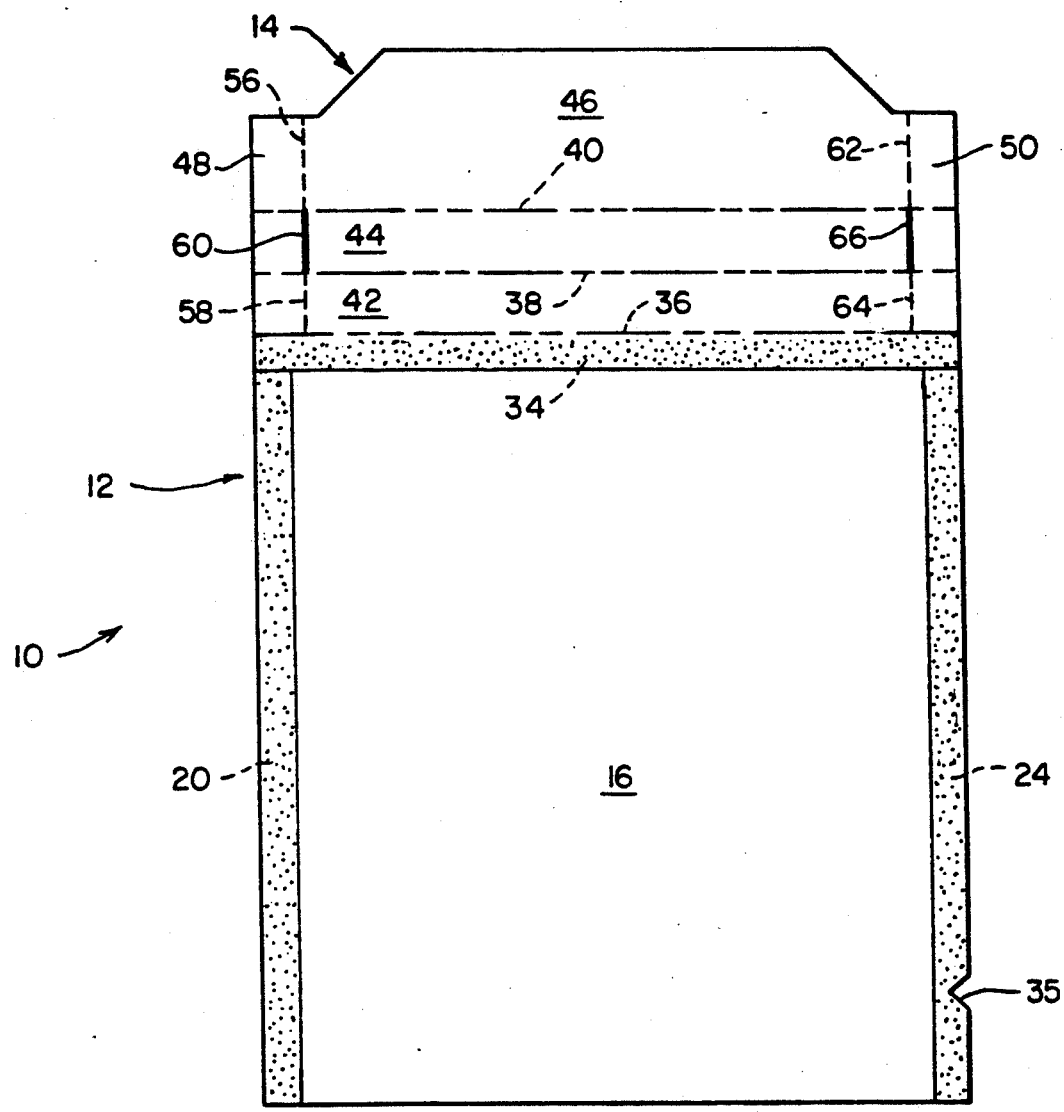
FIG. 1 is a plan view of one side of a package of the invention prior to loading of a stack of film sheets into the package and before the leader is secured to the pouch.

Referring now to the drawings in detail, a package of the invention is generally designated 10 and comprises a pouch 12 and a leader 14. The pouch can be formed from two generally rectangular sheets 16 and 18 (FIGS. 2, 4 and 5) of packaging material. Various packaging materials are suitable for use in making the package. For example, sheets 16,18 car be cut from a laminate comprising layers of black modified high density polyethylene and a metalized polyester or metalized oriented polypropolene with a heat sealant layer provided, as needed, to enable the sheets to be secured together by heat sealing. The leader can be cut from a sheet of rubber modified high density polyethylene, for example.

The sheets 16,18 are of the same size and are placed one above the other. They are initially secured together along the three side edges thereof, for example by lines of heat sealing designated 20, 22 and 24. This leaves the bottom of the pouch open, and the stack of film sheets is loaded into the pouch through the open bottom. Then the sheets 16,18 are sealed together at the bottom of the pouch by a line of heat sealing 26, for example. This leaves a light tight space 28 (FIG. 4) between the sheets 16 and 18.

Figure 2:
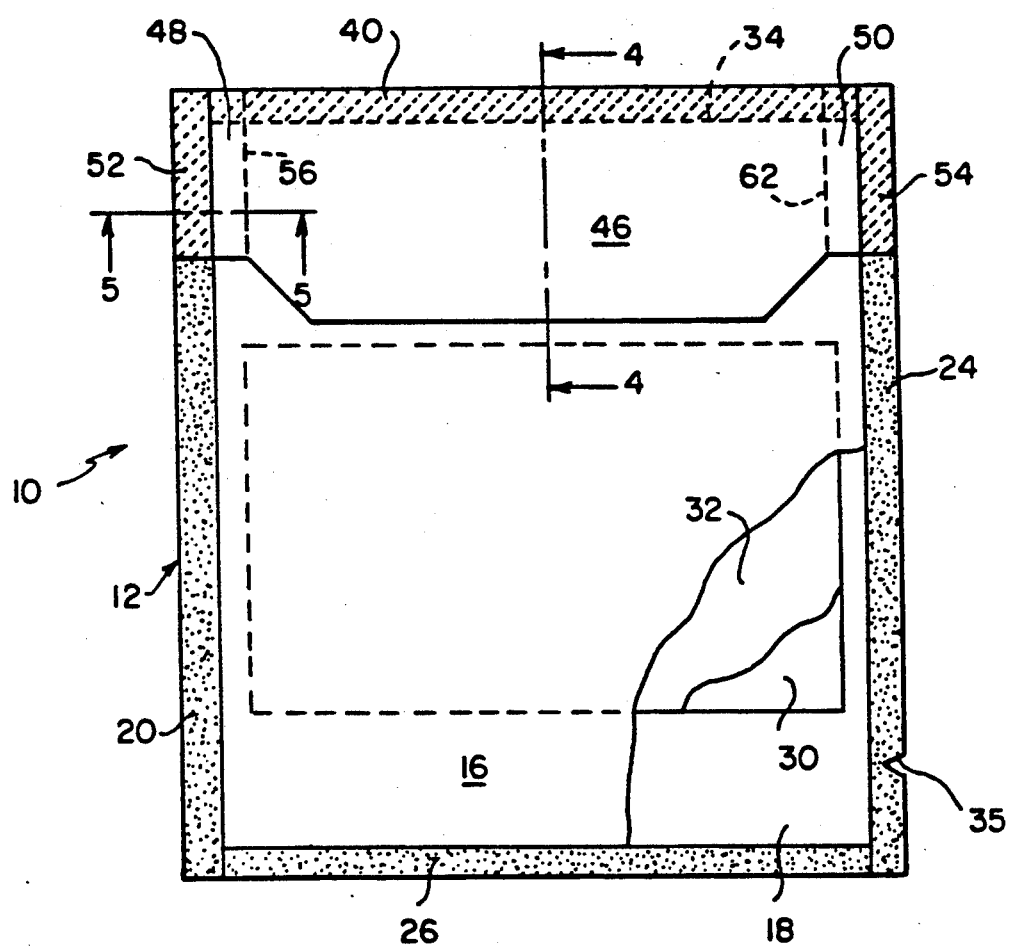
FIG. 2 is a view similar to FIG. 1 after the stack of film sheets has been loaded into the package and the leader secured to the upper and lower faces of the package, a portion of the package being broken away to illustrate the film sheets inside the package.
Figure 3:
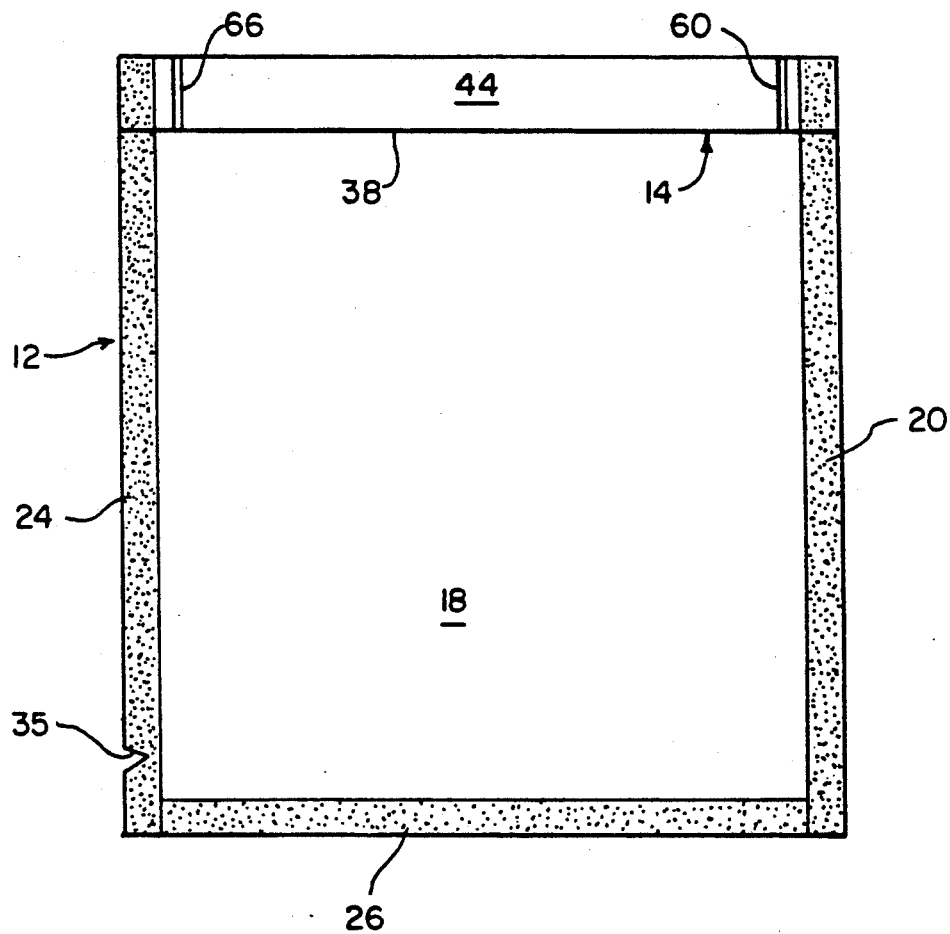
FIG. 3 is a view similar to FIG. 2, but showing the other side of the package.
Figure 4:
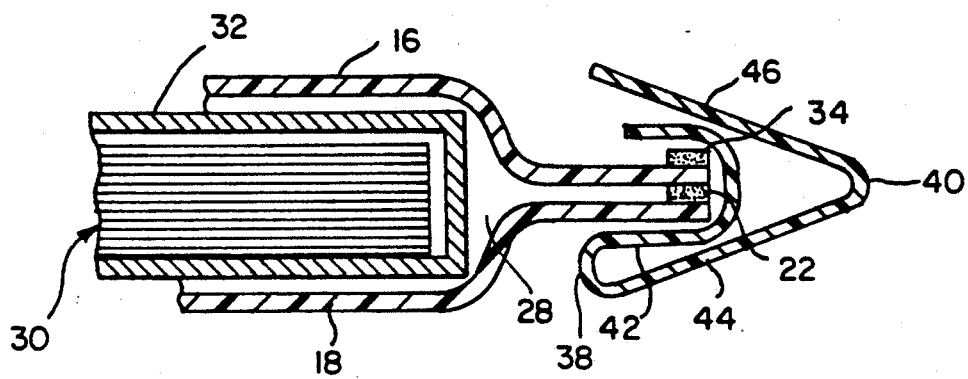
FIGS. 4 and 5 are fragmentary cross sections taken along lines 4—4 and 5—5, respectively, of FIG. 2, illustrating the manner in which the leader is folded over both the upper and lower faces of the package and secured to the faces.

As best shown in FIGS. 2 and 4, the space receives a stack of film sheets 30, and the sheets can be positioned within a U-shaped carrier 32 which protects the film sheets in the package. A notch 35 can be provided in a side edge of sheets 16,18 part way through seal 24 to facilitate tearing the sheets 16,18 to remove the lower portion of the package after it is laded into a magazine.

Leader 14 is secured to the upper face of sheet 16 along the top or leading edge of sheet 16. By way of example, the leader can be secured to the top edge of the pouch by a line of heat sealing 34 located directly above the heat seal line 22 as shown in FIG. 4.

In accordance with the present invention, the leader 14 is folded so that it overlies a portion of the outer faces of both sheets 16,18. More specifically, as shown in FIGS. 1 and 4, the leader is folded along a line 36 that lies along the upper edge of the heat seal line 34 and the upper edges of sheets 16,18. The sheet is also folded along two other spaced lines shown in phantom in FIG. 1 at 38 and 40. These fold lines divide the leader into three transversely extending areas 42, 44 and 46 with area 42 extending from line 36 to line 38, area 44 extending from line 38 to line 40, and area 46 comprising the portion of the leader between line 40 and the upper edge of the leader as viewed in FIG. 1.

Figure 5:
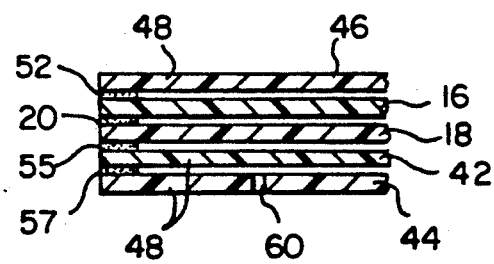

The leader is folded initially along line 36 to place area 42 of the leader along sheet 18 and the bottom face of the pouch. Then the leader is folded along line 38 to place area 44 against the area 42. Finally, the leader is folded along line 40 to place the area 46 of the leader along the sheet 16 and the upper face of the pouch. When the leader has been folded in this manner, side edge portions 48 and 50 of the leader are secured to the sheets 16,18. More specifically, edge portions 48,50 of area 46 of the leader are secured to sheet 16 by heat seal lines shown at 52,54 in FIG. 2. As shown in FIG. 5, edge portion 48 of area 42 is secured to sheet 18 by heat seal line 55. Similarly, edge portion 48 of area 44 is secured to area 42 by heat seal line 57. Areas 42,44 are secured in the same manner to sheet 18 and to each other along the right side edge of the package by heat seal lines (not shown). These seal lines securely hold the side edge portions 48,50 of the leader and the sheets 16,18 together. The other portions of the leader between side edge portions 48,50 are not secured to each other or to the sheets by seal lines, but are held snuggly against the sheets 16 and 18 due to seals 52, 54, 55 and 57. This minimizes the likelihood that the leader will be accidentally caught and separated from the pouch during handling of the pouch.

The leader needs to be separated from sheets 16 and 18 and extended to its FIG. 1 position when the package is placed in a magazine or cassette and the packaging material is to be removed from the stack of film sheets 30. Therefore, means are provided for easily and readily separating the leader from sheets 16,18 to enable the leader to be moved from its folded condition, as shown in FIGS. 2-5, to its extended position, as shown in FIG. 1. More specifically, edge portion 48 of the leader is provided with two spaced lines of perforations 56,68 separated by an elongate slit 60. The rows of perforations 56,58 and the slit are aligned as shown in FIG. 1, and they are offset to the right, as viewed in FIGS. 1 and 2, from the line of heat sealing 52 that holds the leader to the sheets 16 and 18. Similarly, portion 50 of the leader has two spaced lines of perforations 62,64 that are separated by an elongate slit 66. Here, again, the rows of perforation 62,64 and slit 66 are aligned with each other and are positioned along edge portion 50 of the leader so that they are located to the left side of the lines of heat sealing that joins the portion 50 to the sheets 16 and 18. The rows of perforations 56,62 are located in the area 46 of the leader, the slits 60,66 are located in the area 44 of the leader, and the rows of perforations 58,64 are located in the area 42 of the leader.

When the leader is to be extended from the position shown in FIG. 2 where it is sealed to the sheets 16,18 to the extended position shown in FIG. 1 where it projects from the leading edge of the pouch, the operator grasps the center portion of the area 46 of the leader and pulls it upwardly as viewed in FIG. 2 away from sheet 16, thereby causing the leader to be torn along the lines of perforations 56,62. Continued pulling of the area 46 of the leader causes the leader to be torn along lines of perforations 58,64, thereby separating the area 42 from the sheet 18 and enabling it to be pulled into alignment with areas 46 and 44. By providing slits 60,66 in area 44, instead of perforations, there is no need to pull the area 46 of the flap downwardly along the sheet 18 in order to separate area 44 from the side edge portions 48 and 50 of the leader.

A number of advantages result from the construction of the package of the invention. First of all, the package is easily fabricated by placing sheets 16,18 in overlapping relation and sealing the sheets together along seal lines 20, 22 and 24. Then the leader 14 is attached to the leading end portion of sheet 16 by the seal line 34. Next, the leader is folded along lines 36, 38 and 40 and sealed to sheets 16 and 18 by the heat seal lines 52, 54, 55 and 57. The package is loaded with film 30 and carrier 32 through the open or lower end of the package as viewed in FIG. 1. Then the open end of the package is closed by seal line 26 to make a light tight package which fully encloses the film. The leader 14 can be relatively long in order to enable it to be used in magazines where there is a long spacing between the position for the film sheets 30 and a spindle which engages the leader 14 for removing the package of material from the film stack. At the same time, by folding the leader along lines 36, 38 and 40 and securing its edge portions to the sheets 16 and 18, a long leader is easily accommodated and held snuggly against the sheets 16 and 18 where it is unlikely to be accidentally torn away from the pouch. Also, when it is desired to attach the leader to a spindle, the leader is easily disengaged from sheets 16 and 18 by pulling upwardly as viewed in FIGS. 1 and 2 in the manner described hereinbefore. Because the leader does not extend beyond the rectangular pouch portion of the package, empty packages are easily accommodated in film loading equipment having a bin or hopper holding a stack of the packages.

The invention has been described in detail with particular reference to a preferred embodiment thereof, but it will be understood that variations and modifications can be effected within the spirit and scope of the invention.

We claim:

1. A package for enclosing a plurality of sheets of photosensitive material, the package comprising:

a pouch for enclosing a plurality of sheets of photosensitive material, the pouch having a first face and a second face located in generally parallel planes, said first and second faces each having an outer surface and an inner surface, means sealing the faces about the periphery together so as to form a space for receiving and completely surrounding and sealing a plurality of sheets of photosensitive material, the pouch having a leading edge and first and second side edges extending from the leading edge, and a leader secured to the leading edge of the pouch, the leader being engagable for removing the pouch from the plurality of sheets, the leader being folded about the leading edge so that a portion of the leader is adjacent to the outer surface of each of said first and second faces, the leader having side edge portions, means securing the side edge portions of the leader to the first and second side edges of the pouch, the portion of the leader between the side edge portions being free from the pouch, and means for allowing the separation of the leader from the side edges to as to allow the leader to be unfolded from the leading edge and said first and second faces to its unfolded position.

2. A package as set forth in claim 1 wherein said means for allowing separation of the leader from the side edge portions comprises a pair of liens of perforation one adjacent each of the means securing the side edge portions of the leader to the pouch so that the leader can be torn along the lines of perforations to separate the leader from the side edges of the pouch.

3. A package as set forth in claim 1 wherein the means for allowing separation of the leader from the side edge portion comprises two lines of perforation separated by a slit in each of the side edge portions of the leader, the lines of perforations and slit at each side portion being aligned and extending along the side edge portion of the leader.

4. A package containing a plurality of sheets of material, the package comprising;
   a pouch for enclosing the plurality sheets, the pouch having a first face and a second face located in generally parallel planes, said first and second faces each having an inner surface and an outer surface, means sealing the faces together so as to fully surround and seal a plurality of sheets within the pouch, the pouch having a leading edge and first and second side edges extending from the leading edge, and
   a leader secured to the leading edge of the pouch, the leader being engagable for removing the pouch from the plurality of sheets, the leader being folded about the leading edge so that a portion of the leader is adjacent to the outer surface of each of said first and second faces, the leader having side edge protons, means for securing the side edge portions of the leader to the first and second side edges of the pouch, the portion of the leader between the side edge portions being free from the pouch and means for allowing separation of the leader from the side edges so as to allow the leader to be unfolded from about the leading edge and said first and second faces to its unfolded position.

5. A package as set forth in claim 4 wherein said means for allowing separation of the leader from the side edge portions comprises lines of perforation adjacent the means for securing the side edge portions of the leader to the pouch so that the leader can be torn along the lines of perforation to separate the leader from the side edge portion of the pouch.

6. A package as set forth in claim 4 wherein the means for allowing separation of the leader from the side edge portion comprises two lines of perforation separated by a slit in each of the side edge portions of the leader, the lines of perforation and slit at each side portion being aligned and extending along the side edge portion of the leader.

* * * * *